United States Patent [19]  
Plantif et al.

[11] 3,892,073  
[45] July 1, 1975

[54] PYROTECHNIC POSITIONING DEVICE
[75] Inventors: Bernard E. Plantif; André H. Hiss, both of St. Medard En Jalles, France
[73] Assignee: Societe Nationale des Poudres et Explosifs, Paris, France
[22] Filed: May 24, 1973
[21] Appl. No.: 363,490

[30] Foreign Application Priority Data  
June 16, 1972  France .................. 72.21927

[52] U.S. Cl. .................................... 60/635; 60/632
[51] Int. Cl. ...................... F01b 29/8; F02m 13/00
[58] Field of Search ............ 60/26.1, 636, 638, 637, 60/635, 632

[56] References Cited  
UNITED STATES PATENTS  
2,860,736  11/1958  Belsky .......................... 60/26.1 X  
3,459,165  8/1969  Bender et al. ................. 60/26.1 X FOREIGN PATENTS OR APPLICATIONS  
1,157,027  12/1957  France ........................... 60/26.1

Primary Examiner—Wendell E. Burns  
Attorney, Agent, or Firm—Bucknam and Archer

[57] ABSTRACT

New pyrotechnic positioning device which is useful especially as a tensioning device for safety belts.

7 Claims, 3 Drawing Figures

PYROTECHNIC POSITIONING DEVICE

The present invention relates to a pyrotechnic positioning device which operates ultra-rapidly and is useful especially as a tensioning device for safety belts.

Numerous types of jacks exist which make it possible to shift an element firmly fixed to their moving part; however, these jacks are designed to work under a load, in extension or in compression, and, because of this, their movements are relatively slow, reversible, and of predetermined amplitude, which limits the application possibilities.

The object of the present invention is to make it possible, firstly, to move very rapidly any element associated with the new pyrotechnic positioning device and also to limit this movement as a function of the resisting force which is applied to the said element and, secondly, to make this movement irreversible. Such a positioning device can be used especially as a tensioning device for personal safety belts located in vehicles. In effect, it has been found statistically that many motorists do not tighten their safety belts to a sufficient extent. Because of this, they are thrown forwards during a collision and are stopped suddenly by the safety belt. Moreover, when the safety belt is equipped with damping devices to prevent the motorist from being restrained too suddenly, the considerable movement which he makes before coming into complete contact with the protective belt creates the risk that the damping is not carried out completely when he already comes into contact with the windscreen or the dashboard. The positioning device according to the invention thus makes it possible for the motorist who has put on his safety belt to have freedom of movement and only tensions this belt in order to bring it into contact with him during a collision. The effectiveness of the safety belts is thus increased and the risks encountered by the motorist are much more limited.

The pyrotechnic positioning device according to the invention comprises, for this purpose:

a. a cylinder inside which a piston is mounted so as to slide, a rod which is extended to outside the said cylinder being firmly fixed to the piston, and a pyrotechnic charge, the firing of which controls the movement in one direction only of the piston from one end of this cylinder to the other, being placed in a combustion chamber upstream from the said piston, around this rod, means being provided for firing this pyrotechnic charge from outside the cylinder;

b. a unidirectional blocking device acting at the level of the said rod to prevent it from recoiling after the firing; and c. optionally, a component for limiting the tensile force exerted by the rod as it moves.

In the scope of the application of the device according to the invention as a tensioning device for safety belts, this component for limiting the tensile force makes it possible to bring the safety belt into contact with the motorist, without tightening it beyond a limiting value which he can tolerate and is fixed in advance, taking his comfort into account, and to do this independently of the extent to which the safety belt was tightened initially.

According to a first embodiment, the unidirectional blocking component is a ball jamming system, the drawback force of which is produced by the compression of a spring or an elastically deformable disc.

More particularly, the ball jamming system consists of a cell with an internal cylindrical-conical wall with which balls, acted upon by a spring which constantly draws them back onto the concial portion of the said wall, cooperate, the said jamming system being mounted outside the cylinder on the front base of the latter, around the piston rod.

According to a variant, the ball jamming system consists of a ball cage equipped with a circular throat extended by a conical sloping surface with which balls, acted upon by an elastically deformable disc which is mounted in the said throat and is intended constantly to draw these balls back onto the conical sloping surface of the said cage, cooperate; this jamming system is mounted inside the cylinder, around the piston rod, between the latter and the internal wall of the cylinder.

According to another embodiment, the unidirectional blocking component is a buttressing system consisting of a blocking disc swaged in the shape of a cell, perforated with holes, such as a Belleville disc sharpened at its periphery; this disc is inserted on the piston rod and the internal wall of the cylinder, and acts by buttressing on the said wall to prevent any possibility of a return movement by the said rod.

According to yet another embodiment, the component for limiting the tensile force exerted by the piston rod consists of a screw which serves to attach the piston to the said rod, this screw being equipped with a breaking groove at the level of which the screw breaks as soon as this tensile force reaches a limit fixed beforehand and detaches the said piston from the said rod.

According to a variant of this embodiment, the component for limiting the tensile force exerted by the piston rod consists of a ball valve and a calibrated drawback-spring mounted inside an axial bore provided in the screw which attaches the piston to the said rod, this valve causing the combustion chamber to be brought into communication with the portion of the cylinder situated downstream from the piston, as soon as the pressure of the gases from the combustion of the pyrotechnic charge exceeds the calibration of the valve.

According to another characteristic of the invention, the damping of the movement of the piston is achieved either by reduction in pressure due to orifices machined in the rear base of the cylinder or by absorption of energy due to deformation of a pellet made of a deformable material attached to the said base.

According to another characteristic, the pyrotechnic charge is annular and its total period of combustion is less than 100 milliseconds and preferably less than 20 milliseconds. A non-detonating composition with a high rate of combustion is used as the pyrotechnic charge, such as a homogenous double-based powder (powder based on nitrocellulose and nitroglycerine), a single-based powder (powder based on nitrocellulose) or a composite powder which can be extruded (for example, a powder based on perchlorate containing a small percentage of cellulose triacetate binder).

Furthermore, in order to produce a gradual rise in pressure (without creating excess pressure at the start), it is possible to use either a pyrotechnic charge produced from grains which have an increasing surface area of combustion, or a gasless composition for firing the pyrotechnic charge, or both of them.

In the text which follows, the invention is described by referring to the attached drawing in which.

Figure 1:
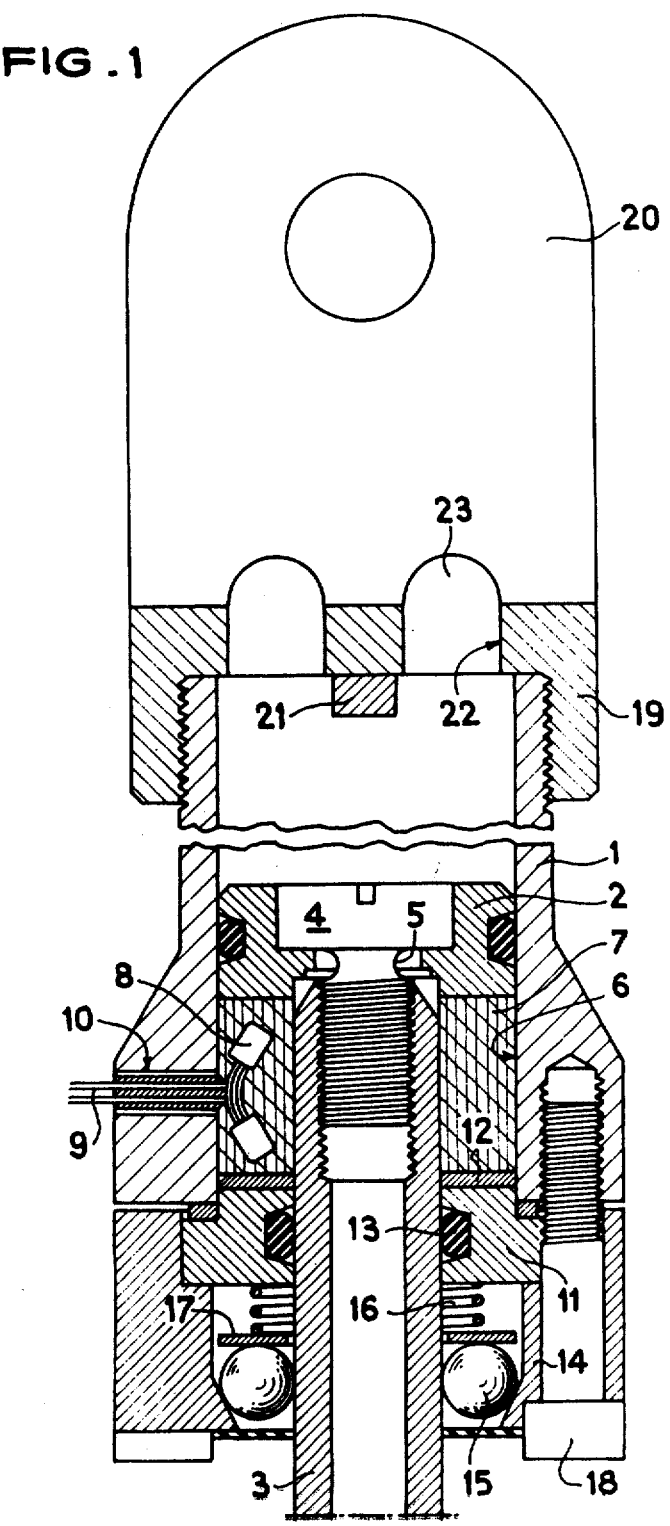
FIG. 1 is a cross-sectional view in elevation of a pyrotechnic positioning device according to the invention.

If reference is made in particular to FIG. 1 of the drawing, the pyrotechnic positioning device according to the invention comprises a tubular body 1 forming the cylinder inside which an ejectable piston 2 can slide, the piston being firmly fixed to a rod 3 by means of a cylindrical joint and a detachable screw 4 which is equipped with a breaking groove 5 intended to limit the tensile force exerted by the said rod 3 and to do so by breaking the screw at the level of this groove and ejecting the piston when this limiting force is reached, as will be seen below.

In the front end of the cylinder, a combustion chamber 6 is machined inside which a pyrotechnic charge 7 is placed together with its igniting device consisting of two micro-ignitors 8 connected via conducting wires 9, through a duct 10 pierced in the wall of the cylinder, to a device which controls the firing by a pulse of electricity, such as an impact detector.

This front end of the cylinder is closed by a base 11 with interposition of a disc 12 for holding the pyrotechnic charge; this base and this disc are equipped with axial orifices to enable the piston rod 3 to pass, leaktightness being ensured by a toroid gasket 13 placed in a groove machined in the said base.

Furthermore, a blocking component, consisting of a cell with an internal cylindrical-conical wall 14 with which balls 15 acted upon by a calibrated spring 16 and a resting disc 17, cooperate, is mounted around the piston rod 3 and attached to the end of the cylinder by screws 18 to prevent the said piston rod from returning, by jamming the balls 15, the drawback force of which is produced by compression of the calibrated spring 16.

The rear end of the cylinder is closed by a base 19 equipped with a mounting lug 20 and a lead pellet 21 intended to damp the ejection of the piston by absorbing kinetic energy due to deformation. Orifices 22 for providing communication with the atmosphere are also provided in this base and are temporarily closed by anti-dust covers 23.

The pyrotechnic positioning device can be used advantageously as a tensioning device for safety belts in automobiles and, in this application, the free end of the piston rod 3 is firmly fixed to the attachment buckle of the said belt, whilst the cylinder 1 is fixed, by means of the mounting lug 20, for example to the floor of the passenger compartment of the vehicle, by an attachment device.

When a collision is imminent, the impact detector emits a pulse of electricity for firing the micro-ignitors 8 which ignite the pyrotechnic charge 7. Under the effect of the pressure of the combustion gases generated by this charge, the piston is propelled backwards into the cylinder 1, carrying the rod 3 with it as it moves, and the rod in its turn exerts a tensile force on the safety belt and tightens it to bring it into contact with the passenger to be protected. The maximum path of the piston rod being fixed, for example, at 17 cm, and the tensile force exerted on the belt by this rod being limited, for example, to 600 or 1,000 daN (?), in order to avoid inconveniencing the passenger, as soon as this limiting force is reached, the screw 4 breaks at the level of the groove 5 and the piston, together with the head of the screw, is ejected and the combination strikes against the rear base 19 of the cylinder. The damping of the impact of these ejected parts is achieved by absorption of energy and deformation of the pellet 21.

The ejection of the piston immediately stops the movement of the rod 3 which, still acted upon by the resisting force exerted at its free end by the safety belt, tends to return towards the front. The irreversibility of the movement of the piston rod is achieved by jamming the balls 15 of the blocking component, which prevents slackening of the safety belt.

Figure 2:
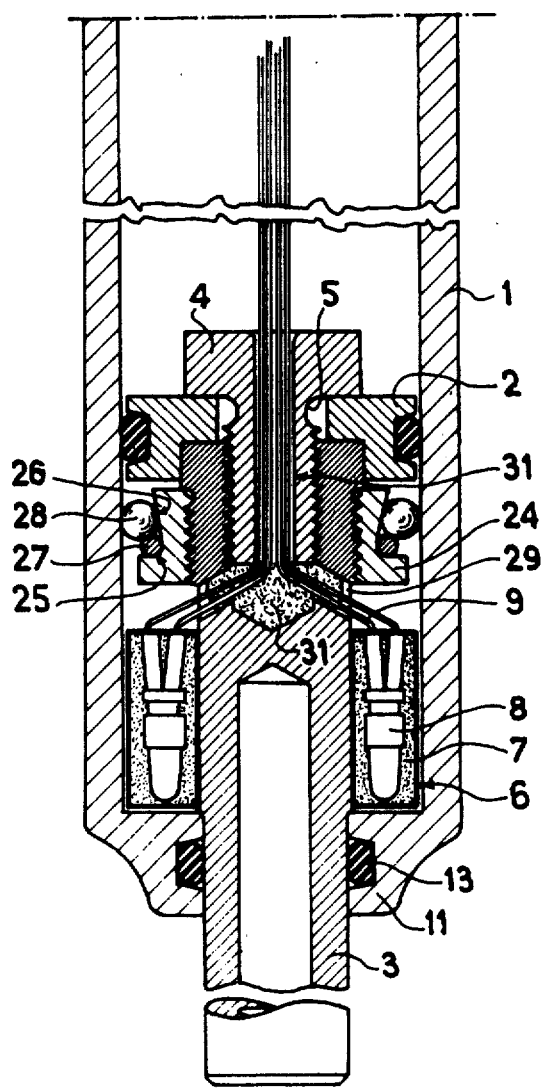
FIG. 2 is a view of a first variant of this device.

According to the variant represented in FIG. 2 of the drawing, the component for blocking the return path of the piston rod is mounted inside the cylinder itself, just in front of the piston (and not at the front end of this cylinder, as in FIG. 1).

For this purpose, a ring 24 equipped with a circular throat 25 which is extended towards the back by a conical sloping surface 26, is attached to the piston rod 3 just in front of the piston 2. A toroid joint 27 made of elastic material is mounted in the throat 25 and there are balls 28 between the sloping surface 26 and the internal wall of the cylinder 1.

Due to this mounting, the return movement of the piston rod 3 is prevented by jamming the balls 28, the drawback force of which is produced by compression of the elastic joint 27.

The advantage of such a blocking system rests in the fact that it acts on a larger surface area than that of the system described in FIG. 1.

Furthermore, the electric wires 9 of the igniting device come out of the cylinder 1 via an orifice pierced in the rear base 19 via side channels 29 machined in the piston rod and the bore 30 machined in the screw 4. Leaktightness of this passage is ensured by a gasket 31.

Figure 3:
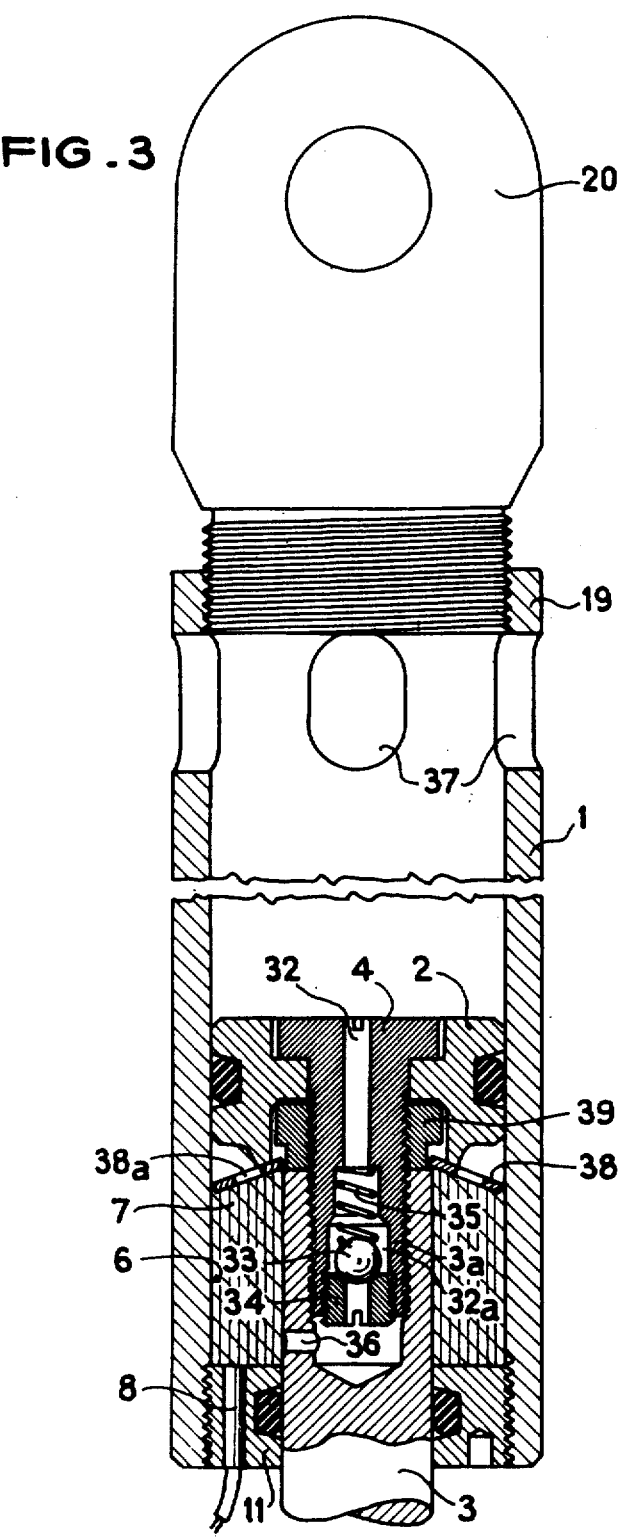
FIG. 3 is a view of a second variant of this device.

According to the variant represented in FIG. 3 of the drawing, the piston 2 is firmly fixed to the piston rod 3 by means of a cylindrical joint by a screw 4 fixed in a recessed hole 3a tapped in this rod. The screw is equipped with an axial bore 32 which starts at the head of this screw and widens out as it goes towards the end of the said screw in order to form a chamber 32a in which a ball valve 33, seat 34 and calibrated spring 35 is (sic) placed.

This valve causes the said chamber 32a to be brought into communication with the combustion chamber 6 in which the pyrotechnic charge 7 is placed, via a side duct 36 pierced in the wall of the rod 3 at the level of the tapped portion 3a. The firing of this pyrotechnic charge is achieved by micro-ignitors 8 mounted in the front base 11 of the cylinder.

The calibration of the ball valve limits the tensile force exerted by the piston rod 3 as follows:

When this limiting force is reached, the ball 33 rises from its seat 34 and causes the pyrotechnic chamber to be brought into communication with the portion of the cylinder situated behind the piston 2, via the side duct 36, the chamber 32a and the bore 32 of the screw 4. The combustion gases partially escape through this passage, which reduces the pressure on the piston and hence the tensile force exerted by the piston rod. The damping of the piston takes place by reduction in pressure due to orifices 37 pierced in the wall of the cylinder 1, in the vicinity of the rear base 19.

In another method, the blocking component is a buttressing system consisting of a blocking disc 38 inserted on the piston rod 3 between the pyrotechnic charge 7 on the one hand and the piston 2 and a spacer disc 39 on the other hand.

This blocking disc 38 is a disc swaged in the shape of a cell perforated with holes 38a and made of a very strong material, for example, a disc of the "Belleville" type which is sharpened at the periphery. The elasticity and the orientation of the sharpened portion make it possible for the mobile combination to shift during the firing and prevent any possibility of a return movement by this combination by buttressing of the disc of the internal wall of the cylinder. In consideration of the small internal diameter of the cylinder, this solution is advantageously recommended when the tensile force exerted on the piston rod remains low, for example 250 daN. This value can be increased if the buttressing is carried out on parts machined on the internal wall of the cylinder, for example circular grooves.

By way of example, the device according to FIG. 3 weighs 500 g and the maximum displacement of 17 cm is reached 11 milliseconds after the pulse of electricity for firing. The time interval between this pulse and the moment when the pressure reaches one tenth of the maximum pressure is 3.5 milliseconds. The maximim pressure reached when the piston first starts to move is 120 bars and then decreases during the displacement. The charge consists firstly of two micro-ignitors 8 each consisting of a "Gevelot" ignition apparatus of the ultra-rapid P3 type or of the flat miniature P65 type reinforced with 0.35 g of ignition powder contained in a nitrocellulose cup, and secondly, of a charge of 2 g of homogeneous double-based powder grains of length 1 cm and the octagonal cross-section of which, of thickness 5 mm, contains 19 holes to enable the period of combustion to be 5 milliseconds. The residual pressure is only about 20 bars for a maximum pressure of 120 bars, but by increasing the thickness of the tubular body of the device, a maximum pressure of 200 bars can be reached without disadvantage.

We claim:

1. A pyrotechnic positioning device which comprises a cylinder, a piston disposed for movement in one direction within said cylinder, a rod connected to said piston for movement therewith and extending beyond said cylinder to impart such movement to a means to be positioned by the device, a pyrotechnic charge having an annular configuration and disposed within said cylinder in laterally surrounding relation to said rod and behind said piston, said charge being detonatable by means operable from outside said cylinder to propel the piston and rod in said one direction, and unidirectional acting blocking means disposed to allow movement of the rod in said one direction and block movement thereof in the opposite direction.

2. A pyrotechnic positioning device according to claim 1 including a breakable fastener connecting the piston to the rod, said fastener being disposed to break and release the piston from the rod upon occurrence of a predetermined tensile force in the rod to correspondingly limit the force exerted upon the means to be positioned.

3. A pyrotechnic positioning device according to claim 1 wherein said unidirectional acting blocking means includes a plurality of balls arranged between a surface that moves in unison with the rod and a surface that is stationary with respect to the cylinder, said balls being put into jamming engagement with said surfaces to block movement of the rod in said opposite direction.

4. A pyrotechnic positioning device according to claim 1 wherein said unidirectional acting blocking means includes at least one blocking member arranged between a surface that moves in unison with the rod and a surface that is stationary with respect to the cylinder, said blocking member being put into jamming engagement with said surfaces to block movement of the rod in said opposite direction.

5. A pyrotechnic positioning device according to claim 1 wherein said charge is disposed in endwise abutting contact with the piston.

6. A pyrotechnic positioning device according to claim 1 wherein said cylinder has at least one orifice operable to clamp the movement of the piston.

7. A pyrotechnic positioning device according to claim 1 including a deformable member disposed within said cylinder for impact with the piston to absorb energy therefrom.

* * * * *